(12) United States Patent
Wothke et al.

(10) Patent No.: US 8,759,457 B2
(45) Date of Patent: Jun. 24, 2014

(54) EPOXY RESIN COMPOSITIONS HAVING IMPROVED LOW TEMPERATURE CURE PROPERTIES AND PROCESSES AND INTERMEDIATES FOR MAKING THE SAME

(75) Inventors: Jean C. Wothke, Reichstett (FR); Herold Ulrich, Buehl (DE); Manuela Ehreiser, Baden-Baden (DE)

(73) Assignee: Dow Global Technologies, LLC, Midland, MI (US)

( * ) Notice: Subject to any disclaimer, the term of this patent is extended or adjusted under 35 U.S.C. 154(b) by 790 days.

(21) Appl. No.: 12/935,026

(22) PCT Filed: Mar. 10, 2009

(86) PCT No.: PCT/US2009/036593
§ 371 (c)(1),
(2), (4) Date: Sep. 28, 2010

(87) PCT Pub. No.: WO2009/126393
PCT Pub. Date: Oct. 15, 2009

(65) Prior Publication Data
US 2011/0020555 A1  Jan. 27, 2011

Related U.S. Application Data

(60) Provisional application No. 61/042,950, filed on Apr. 7, 2008.

(51) Int. Cl.
*C08L 63/00* (2006.01)
(52) U.S. Cl.
USPC .............................. 525/523; 427/386; 528/421
(58) Field of Classification Search
USPC .............................. 427/386; 525/523; 528/421
See application file for complete search history.

(56) References Cited

U.S. PATENT DOCUMENTS

| 5,955,184 | A | 9/1999 | Honda et al. | |
|---|---|---|---|---|
| 6,262,148 | B1 * | 7/2001 | Cheng et al. | 523/458 |
| 2003/0170396 | A1 | 9/2003 | Yokoi et al. | |

FOREIGN PATENT DOCUMENTS

| EP | 0066447 | 8/1982 |
|---|---|---|
| EP | 0795570 | 9/1997 |
| GB | 868892 | 5/1961 |
| GB | 1429076 | 3/1976 |
| GB | 1529740 | 10/1978 |
| JP | 06-017024 | 1/1994 |
| JP | 09-263713 | 10/1997 |
| JP | 200063490 | 2/2000 |
| JP | 2002069154 | 3/2002 |
| JP | 2002080564 | 3/2002 |
| JP | 2007277508 | 10/2007 |
| JP | 2009540046 | 11/2009 |
| WO | 2008078967 | 7/2008 |

OTHER PUBLICATIONS

International Search Report from related PCT application PCT/US2009036593, dated May 26, 2010, 8 pages.
International Preliminary Report on Patentability from related PCT application PCT/US2009036593, dated Jul. 28, 2010, 22 pages.

* cited by examiner

*Primary Examiner* — Robert S Walters, Jr.
(74) *Attorney, Agent, or Firm* — Brooks, Cameron & Huebsch, PLLC

(57) ABSTRACT

Two-component epoxy resin compositions are disclosed. The polyepoxide component comprises one or more oligomers having at least one aromatic ring substituent R4X1—in which R4 represents a substituted or unsubstituted aliphatic group having at least 4 carbon atoms, a substituted or unsubstituted cycloaliphatic group having at least 5 carbon atoms, a poly (oxyalkylene) group wherein the average number of carbon atoms per oxyalkylene unit is at least 3, or a aryl group having one or more of the foregoing substituents, bonded directly to the aryl group via a covalent bond or bonded to the aryl group via an oxy, a thio, or a carbonyloxy divalent linking group, or a combination thereof, and X1 represents a covalent bond or a divalent moiety selected from oxy, thio, carbonyloxy, and —X2C(R2)2C(R1)(OH)C(R2)2O—, in which X2 represents a covalent bond or a divalent moiety selected from oxy, thio, and carbonyloxy, R1 represents —H or —C1-14 alkyl, and each R independently represents —H or —CH3. The curing agent component comprises one or more compounds of Formula (VI): in which each Z independently represents a divalent hydrocarbylene group having from 2 to 20 carbon atoms; R5 represents a Cg-2O saturated or unsaturated aliphatic ring substituent; each R6 independently represents a hydrogen atom or a hydrocarbyl group having from 1 to 10 carbon atoms and optionally at least one hetero atom; each m independently is an integer in the range from 1 to 4; k represents an integer in the range from 1 to 3; and j represents 1 or 2, and/or one or more adducts of one or more Formula (VI) compounds. The two-component epoxy resin compositions are capable of faster cure at low ambient temperatures, such as at temperatures below 100C, such as below 50C or even below 00C, to quickly form nonsticky coatings and seals having a good appearance.

$(R^5)Ph(OH)_j[CHR^6NH(ZNH)_mH]_k$ (VI)

3 Claims, No Drawings

EPOXY RESIN COMPOSITIONS HAVING IMPROVED LOW TEMPERATURE CURE PROPERTIES AND PROCESSES AND INTERMEDIATES FOR MAKING THE SAME

CROSS REFERENCE TO RELATED APPLICATIONS

This is a §371 application of PCT International Patent Application Number PCT/US2009/036593 filed Mar. 10, 2009, and claims priority from provisional application Ser. No. 61/042,950 filed Apr. 7, 2008, which is incorporated herein by reference in its entirety.

BACKGROUND OF THE INVENTION

The present invention relates to epoxy resins suitable for use in coating and adhesive formulations and processes for making the same. In particular, the present invention relates to epoxy resin compositions capable of faster cure at low temperature.

Epoxy resin compositions suitable for use in coating and adhesive formulations are well known. They are commercially available as the one-component type and the two-component type. The two-component type comprises a polyepoxide composition and a hardener. The polyepoxide composition cures after the hardener is admixed with the polyepoxide composition. The two-component type is often used when a particularly durable, corrosion-resistant, and strongly adherent coating or seal is required for large metal or concrete structures such as bridges, ships, industrial tanks, etc., where application of the coating or seal must be performed under ambient conditions.

A problem often associated with two-component type epoxy coatings is that the rate of cure is significantly reduced at low temperatures, especially at temperatures below 10° C. and particularly at temperatures below 5° C. At such low temperatures, many epoxy curing agents also tend to rise to the surface during cure, which tends to leave a greasy film on the surface. The greasy film tends to have an adverse effect on the appearance of the coating or seal and can lead to intercoat adhesion failure when subsequent coating or sealing layers are applied.

One approach currently used to address this problem is to use phenalkamine hardeners in combination with difunctional epoxy resins based on bisphenol A in winter grade epoxy formulations. While this approach is capable of curing at low ambient temperatures to provide coatings resistant to corrosion having a good appearance, the rate of cure remains slower than desired by coatings and sealants users.

It has been observed that when the functionality of the epoxy resin is increased to try to accelerate the cure rate, coatings made by combining such higher functional epoxy resins with phenalkamine hardeners have a grainy appearance and form a nonhomogeneous film that remains sticky for a long period of time.

A two-component type polyepoxide composition and hardener combination is therefore desired that provides a nonsticky epoxy coating or seal having a good appearance and high resistance to corrosion at a faster low ambient temperature cure rate.

The present invention solves this and other problems as described in more detail below.

SUMMARY OF THE INVENTION

One aspect of the present invention is a kit for preparing a curable polyepoxide composition comprising:

(A) a polyepoxide-containing composition comprising at least one oligomer comprising multiple units of Formula (I)

$$[Ph(-R)_x(-X-)_y] \quad (I)$$

Wherein Ph represents a phenyl ring; each X independently represents a divalent group covalently bonded to the phenyl ring selected from a divalent hydrocarbylene group having from 1 to 6 carbon atoms, an ether group having 2 to 6 carbon atoms, and $-OC(R^2)_2C(R^1)(OR^3)C(R^2)_2O-$; each R independently represents a monovalent group covalently bonded to the phenyl ring selected from $R^4X^1-$ and

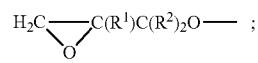;

each $R^1$ independently represents $-H$ or $-C_{1-14}$ alkyl; each $R^2$ independently represents $-H$ or $-CH_3$; each $R^3$ independently represents $-H$ or $-C(R^2)_2C(R^1)(OH)C(R^2)_2OPh(R)_x(-X-)_y$; each $R^4$ independently represents a substituted or unsubstituted aliphatic group having at least 4 carbon atoms, a substituted or unsubstituted cycloaliphatic group having at least 5 carbon atoms, a poly(oxyalkylene) group wherein the average number of carbon atoms per oxyalkylene unit is at least 3, or a substituted aryl group having one or more substituents, bonded directly to the aryl group via a covalent bond or bonded to the aryl group via an oxy, a thio, or a carbonyloxy divalent linking group, including one or more substituted or unsubstituted aliphatic groups having at least 4 carbon atoms, one or more substituted or unsubstituted cycloaliphatic groups having at least 5 carbon atoms, and/or one or more poly(oxyalkylene) groups wherein the average number of carbon atoms per oxyalkylene unit is at least 3, or a combination thereof; each $X^1$ independently represents a covalent bond or a divalent moiety selected from oxy, thio, carbonyloxy, and $-X^2C(R^2)_2C(R^1)(OH)C(R^2)_2O-$, wherein $X^2$ represents a covalent bond or a divalent moiety selected from oxy, thio, and carbonyloxy; x represents an integer in the range from 0 to 6 minus y; y represents an integer in the range from 0 to 3; x+y≥1; the oligomer has at least 3 units of Formula (I) per molecule and an epoxy functionality of at least 2 per molecule; the oligomer has at least one divalent X group per molecule; Ph optionally has one or more monovalent aromatic ring substituents other than $R^4X^1-$ and

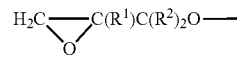

the number of Ph groups per oligomer molecule exceeds the number of divalent X groups in the same oligomer molecule; and the oligomer comprises at least one unit of Formula (I) wherein at least one R substituent is $R^4X^1-$; and (B) one or more curing agents selected from one or more compounds of Formula (VI):

$$(R^5)Ph(OH)_j[CHR^6NH(ZNH)_mH]_k \quad (VI)$$

in which each Z independently represents a divalent hydrocarbylene group having from 2 to 20 carbon atoms; $R^5$ represents a $C_{8-20}$ saturated or unsaturated aliphatic ring substituent; each $R^6$ independently represents a hydrogen atom or a hydrocarbyl group having from 1 to 10 carbon atoms and optionally at least one hetero atom; each m independently is an integer in the range from 1 to 4; k represents an integer in the range from 1 to 3; and j represents 1 or 2, and/or one or more adducts of one or more Formula (VI) compounds.

Another aspect of the present invention is polyepoxide compositions suitable for use in the kit comprising a mixture of two or more oligomers having multiple units of Formula (I) per molecule:

$$[Ph(-R)_x(-X-)_y] \qquad (I)$$

Wherein Ph represents a phenyl ring; each X independently represents a divalent group covalently bonded to the phenyl ring selected from a divalent hydrocarbylene group having from 1 to 6 carbon atoms, an ether group having 2 to 6 carbon atoms, and $-OC(R^2)_2C(R^1)(OR^3)C(R^2)_2O-$ and each R independently represents a monovalent group covalently bonded to the phenyl ring selected from $R^4X^1-$ and

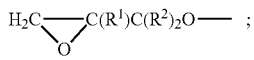

each $R^1$ independently represents $-H$ or $-C_{1-14}$ alkyl; each $R^2$ independently represents $-H$ or $-CH_3$; each $R^3$ independently represents $-H$ or $-C(R^2)_2C(R^1)(OH)C(R^2)_2OPh(R)_x(-X-)_y$; each $R^4$ independently represents a substituted or unsubstituted aliphatic group having at least 4 carbon atoms, a substituted or unsubstituted cycloaliphatic group having at least 5 carbon atoms, a poly(oxyalkylene) group wherein the average number of carbon atoms per oxyalkylene unit is at least 3, or an aryl group having one or more substituents, bonded directly to the aryl group via a covalent bond or bonded to the aryl group via an oxy, a thio, or a carbonyloxy divalent linking group, selected from substituted or unsubstituted aliphatic groups having at least 4 carbon atoms, substituted or unsubstituted cycloaliphatic groups having at least 5 carbon atoms, poly(oxyalkylene) groups wherein the average number of carbon atoms per oxyalkylene unit is at least 3, or a combination thereof;

each $X^1$ independently represents a covalent bond or a divalent moiety selected from oxy, thio, carbonyloxy, and $-X^2C(R^2)_2C(R^1)(OH)C(R^2)_2O-$, wherein $X^2$ represents a covalent bond or a divalent moiety selected from oxy and thio; x represents an integer in the range from 0 to 6 minus y; y represents 0, 1, or 2; and $x+y \geq 1$; the mixture of oligomers having an average of at least 2.5 units of Formula (I) per molecule and an average epoxy functionality of at least 2 per molecule; the average number of divalent X groups per oligomer molecule is at least 1; Ph optionally has one or more monovalent aromatic ring substituents other than $R^4X^1-$ and

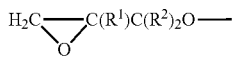

the average number of Ph groups per oligomer molecule exceeds the average number of divalent X groups per oligomer molecule; and from 0.05 to 50 percent of the total number of Ph groups in the mixture of oligomers have at least one $R^4X^1-$ aromatic ring substituent.

Another aspect of the present invention is an oligomer according to the present invention having an epoxy functionality of at least 2 and comprising multiple units per oligomer molecule represented by the above Formula (I), wherein (1) at least one divalent group X per unit of Formula (I) within an oligomer molecule is at least one a divalent hydrocarbylene group having from 1 to 6 carbon atoms or an ether group having 2 to 6 carbon atoms and the same unit of Formula (I) within the oligomer molecule, but less than all the units of Formula (I) in the oligomer molecule, has at least one $R^4X^1-$ aromatic ring substituent; and/or (2) at least one unit of Formula (I) within an oligomer molecule has at least one $R^4X^1-$ aromatic ring substituent wherein $R^4X^1-$ represents $R^4X^2C(R^2)_2C(R^1)(OR^3)C(R^2)_2O-$ in which (a) $X^2$ represents a covalent bond, oxy or thio; $R^1$, $R^2$, $R^3$ and $R^4$ have the same meaning as in Formula (I); and/or (b) $X^2$, $R^1$ and $R^2$ have the same meaning as in Formula (I) and $R^4$ represents a substituted or unsubstituted aliphatic group having at least 4 carbon atoms, a substituted or unsubstituted cycloaliphatic group having at least 5 carbon atoms, or a poly(oxyalkylene) group wherein the average number of carbon atoms per oxyalkylene unit is at least 3, or a combination thereof.

Another aspect of the present invention is a process for making polyepoxide compositions suitable for use in the kit according to the present invention comprising reacting, optionally in the presence of one or more catalysts:

(a) at least one aromatic polyepoxide compound having an average of at least 2.5 epoxy groups per molecule with (b) 0.05 to less than 0.5 equivalent per epoxy equivalent of the epoxy compound (a) of at least one epoxy-reactive compound having at least one $R^4$ substituent, wherein each $R^4$ substituent independently has the same meaning as in Formula (I), and at least one functional group capable of reacting with an epoxy group to form at least one covalent bond between the polyepoxide compound (a) and the epoxy-reactive compound (b).

Another aspect of the present invention is a process for making polyepoxide compositions suitable for use in the kit according to the present invention comprising branching a mixture of aromatic epoxide compounds having an average of at least 1.5 epoxy groups per molecule in the presence of one or more lithium and/or cesium compounds to increase the average number of epoxy groups per molecule of the aromatic epoxide compounds until a desired average number of epoxy groups per molecule of the aromatic epoxide compounds of at least 2.2 epoxy groups per molecule of aromatic epoxide compounds is obtained and thereafter terminating the branching reaction, wherein the mixture of aromatic epoxide compounds subjected to branching comprises at least one aromatic epoxide compound having at least one $R^4X^1-$ aromatic ring substituent and at least one aromatic epoxide compound not having at least one $R^4X^1-$ aromatic ring substituent, in which $R^4$ and $X^1-$ have the same meaning as in Formula (I).

A further aspect of the present invention is a process suitable for making oligomers according to the present invention comprising epoxidizing at least one phenolic precursor according to the present invention.

Phenolic precursors suitable for making oligomers according to the present invention include phenolic precursors according to the present invention comprising multiple units of Formula (IB):

$$[Ph(-R^B)_x(-X-)_y] \qquad (IB)$$

within the phenolic precursor molecule, wherein each $R^B$ of Formula (IB) independently represents a monovalent group covalently bonded to Ph selected from $R^4X^1-$ and $-OH$; each Ph, X, $X^1$, $R^4$, x and y of Formula (IB) independently has the same meaning as in the above polyepoxide units of Formula (I); the multiple units of Formula (IB) within the phenolic precursor comprise at least 2 phenolic —OH groups; the average number of divalent X groups per phenolic precursor molecule is at least 1; Ph optionally has one or more monovalent aromatic ring substituents other than $R^4X^1$— and

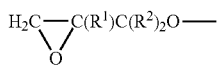

the average number of Ph groups per phenolic precursor molecule exceeds the average number of divalent X groups per phenolic precursor molecule; and:
(1) at least one divalent X group per unit of Formula (IB) is a divalent hydrocarbylene group having from 1 to 6 carbon atoms or an ether group having 2 to 6 carbon atoms and the same unit of Formula (IB), but less than all the units of Formula (IB) per phenolic precursor molecule, has at least one $R^4X^1$— aromatic ring substituent; and/or
(2) at least one unit of Formula (IB) within a phenolic precursor molecule has at least one specified $R^4X^1$— aromatic ring substituent wherein the specified $R^4X^1$— aromatic ring substituent represents $R^4X^2C(R^2)_2C(R^1)(OH)C(R^2)_2O$— in which (a) $X^2$ represents a covalent bond, oxy or thio; $R^1$, $R^2$, and $R^4$ are defined above and/or (b) $X^2$, $R^1$, and $R^2$ are defined as above in Formula (IB) and $R^4$ of the specified $R^4X^1$— aromatic ring substituent represents a substituted or unsubstituted aliphatic group having at least 4 carbon atoms, a substituted or unsubstituted cycloaliphatic group having at least 5 carbon atoms, or a poly(oxyalkylene) group wherein the average number of carbon atoms per oxyalkylene unit is at least 3.

Another aspect of the present invention is phenolic precursors made by reacting, optionally in the presence of one or more catalysts:
(a) a phenolic compound having an average of at least 2.5 phenolic —OH groups with
(b) an average from 0.05 to less than 0.5 equivalent per phenolic hydroxy group equivalent of the phenolic compound (a) of at least one monofunctional compound comprising a $R^4$ and a functional group capable of reacting with a phenolic hydroxy group of the phenolic compound (a) to form at least one covalent bond between the monofunctional compound (b) and the phenolic compound (a);
in which the $R^4$ has the same meaning as in Formulae (I) and (IB).

Another aspect of the present invention is a process for making phenolic precursors comprising reacting, optionally in the presence of one or more catalysts, (1)(a) at least one phenolic compound not having at least one specified $R^4X^1$— aromatic ring substituent and (b) at least one phenolic compound having at least 2 phenolic —OH groups and at least one specified $R^4X^1$— aromatic ring substituent per molecule with (2) at least one epoxy compound having an epoxy functionality of at least 2 per molecule, wherein $R^4$ and $X^1$ of the specified $R^4X^1$— aromatic ring substituent has the same meaning as in Formulae (I) and (IB).

Another aspect of the present invention is a process for making phenolic precursors comprising reacting, optionally in the presence of one or more catalysts, (1) at least one phenolic compound having at least 2 phenolic —OH substituents and (2) at least one monoepoxy compound having at least one specified $R^4$ group at a ratio of monoepoxy compound equivalents to phenolic compound equivalents in the range from 0.05:1 to 0.5:1, wherein each $R^4$ group is independently selected from a substituted or unsubstituted aliphatic group having at least 4 carbon atoms, a substituted or unsubstituted cycloaliphatic group having at least 5 carbon atoms, or a poly(oxyalkylene) group wherein the average number of carbon atoms per oxyalkylene unit is at least 3.

Yet another aspect of the present invention is epoxy base compositions suitable for curing with a curing agent to make coatings and seals comprising a polyepoxide composition comprising the above-described oligomer. Such coatings and sealants cure faster than state of the art winter grade epoxy coatings and sealants at a temperature below 20° C., such as 15° C. or below, 10° C. or below, 5° C. or below, or 0° C. or below, to form a cured coating having a smooth, nonsticky surface having a good appearance capable of protecting surfaces from corrosion.

Another aspect of the present invention is compositions comprising at least one curing agent (B) admixed with the oligomer (A) for curing the polyepoxide composition.

Another aspect of the present invention is a three-dimensional covalently-crosslinked polymeric network of atoms comprising multiple units of Formula (II):

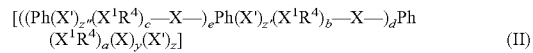

wherein each X' independently represents a polyvalent group of the chemical formula:

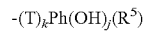

wherein T represents

T is covalently bonded to the phenyl ring of Formula (II); each Ph, X, $X^1$, $R^1$, $R^2$, $R^3$ and $R^4$ independently has the same meaning as in Formula (I); each $R^5$, $R^6$, Z, m, k and j independently has the same meaning as in Formula (VI); each a, b, c, e, y, z, z', and z" independently is equal to 0, 1 or 2; d is equal to 1 or 2; a+b+c≥1; and z+z'+z"≥1.

DETAILED DESCRIPTION OF THE INVENTION

Definitions

As used herein, the term oligomer refers to compounds having multiple units defined by a specified unit formula. The units may be the same or different and may be bonded indirectly or, preferably, directly to each other. This term is intended to include at least 2 units (e.g., dimers), more preferably at least 3 units (trimers), up to 10 units, more preferably up to 8 units, even more preferably up to 6 units, even more preferably up to 5 units, and even more preferably up to 4 units (e.g., tetramers).

As used herein, the term "phenolic compound" means compounds comprising one or more substituted or unsubstituted aromatic rings having one or more phenolic —OH groups per molecule covalently bonded to the aromatic ring(s). The term "monophenolic compound" refers to phenolic compounds having one phenolic —OH group per molecule and the term "polyphenolic compound" refers to phenolic compounds having more than one phenolic —OH group per molecule. Examples of monophenolic compounds included phenol; monoalkylphenols such as o-cresol, p-cresol, n-butylphenol, i-butylphenol, t-butylphenol, amylphenol, hexylphenol, heptylphenol, octylphenol, nonylphenol, decylphenol, dodecylphenol, pentadecylphenol, pentadecenylphenol, and octadecylphenol; dialkylphenols such as 2,4-xylenol, 3,4-xylenol, 3,5-xylenol, alkylcresols, dipropylphenol, dibutylphenol, diamylphenol, dihexylphenol, diheptylphenol, dioctylphenol, dinonylphenol, didecylphenol, didodecylphenol, dipentadecylphenol, and dioctadecylphenol; trialkylphenols such as alkylxylylphenols; and alkoxyphenols such as o-methoxyphenol, p-methoxyphenol; and mixtures thereof. Examples of polyphenolic compounds include resorcinol, catechol, hydroquinone, bisphenol A, bisphenol F, novolac, and mixtures thereof.

As used herein, the terms "hydrocarbyl" and "hydrocarbylene" refer to mono- and divalent chemical structures (or moieties), respectively, comprising carbon atoms and hydrogen atoms covalently bonded to each other. The structures (or moieties) may be saturated or unsaturated and may contain one or more linear, branched and/or ring structures. Such structures (or moieties) may contain atoms other than carbon and hydrogen (referred to herein as "hetero" atoms). Examples of such acceptable hetero atoms are nitrogen, oxygen, sulfur and phosphorus atoms. The ratio of the number of carbon atoms plus the number of hydrogen atoms relative to the number of hetero atoms is at least 1, preferably at least 2, and even more preferably at least 3. Such hydrocarbyl or hydrocarbylene structures (or moieties) preferably do not contain any hetero atoms.

Unless stated otherwise, the term "alkyl" includes primary, secondary and tertiary alkyl groups and/or branched- and straight-chain alkyl groups.

As used herein, the terms "epoxy functional group" and "epoxy functionality" refer to substituents comprising an oxirane ring. Preferred epoxy functional groups and epoxy functionality include glycidyl ether groups and glycidyl ester groups. Glycidyl ether groups are preferred over glycidyl ester groups.

As used herein, the term "glycidyl ether" refers to an epoxy functional end group comprising an oxirane ring linked to divalent oxy via a methylene group. The methylene group is attached to a substituted or unsubstituted oxirane ring carbon atom. The substituted oxirane ring carbon atom may have a $C_{1-14}$ alkyl group.

Epoxy equivalent weight (hereinafter abbreviated "EEW") refers to the number average molecular weight ($MW_n$) of an epoxy compound divided by the average number of epoxy groups per molecule.

The number of "epoxy equivalents" in relation to the one or more epoxy compounds is the sum of the contribution from each of the one or more epoxy compounds. The contribution from each of the one or more epoxy compounds to the epoxy equivalents is defined as grams of the epoxy compound divided by the epoxy equivalent weight of the epoxy compound, where the epoxy equivalent weight of the epoxy compound is determined as grams of the epoxy compound equivalent to 1 mole of epoxy groups. For adducts with epoxy compounds, the contribution of the reactants before adductation is used for the determination of the number of "epoxy equivalents" in the epoxy-based system.

As used herein, the term "active hydrogen equivalents" refers solely to reactive hydrogen atoms linked to nitrogen.

The number of "active hydrogen equivalents" in relation to the one or more curing agents is the sum of the contribution from each of the one or more curing agents. The contribution from each of the one or more curing agents to the active hydrogen equivalents is defined as grams of the curing agent divided by the active hydrogen equivalent weight of the curing agent, where the active hydrogen equivalent weight of the curing agent is determined as: grams of the curing agent equivalent to 1 mole of active hydrogen. For adducts with epoxy resins the contribution of the reactants before adductation is used for the determination of the number of "active hydrogen equivalents" in the epoxy-based binder system.

As used herein, the expression "epoxy base" refers to compositions containing at least one polyepoxide oligomer that is suitable for combining with one or more curing agents, or hardener compositions, to make a cured coating or seal. The epoxy base preferably contains one or more auxiliary components in admixture with at least one polyepoxide oligomer. Examples of auxiliary components include catalysts, thixotropes, solvents, fillers, air release additives, pigments, wetting additives, tackifiers, plasticizers, surfactants, dispersing agents, de-foaming agents, stabilizers, epoxy accelerators, corrosion inhibitors, coalescing agents, anti-settling agents, and/or dyes.

As used herein, the expression "hardener composition" refers to compositions containing at least one curing agent. The hardener compositions may contain one or more auxiliary components in admixture with one or more curing agents. Examples of optional auxiliary components include catalysts, solvents, air release additives, pigments, wetting additives, tackifiers, plasticizers, surfactants, dispersing agents, de-foaming agents, stabilizers, epoxy accelerators, corrosion inhibitors, coalescing agents, anti-settling agents, and/or dyes.

Polyepoxide Composition (A):

As stated above, the polyepoxide composition comprises at least one oligomer comprising multiple units of the above-described Formula (I).

The average number of divalent groups, y, is preferably at least 0.5, more preferably at least 0.6, and even more preferably at least 0.7 and is preferably on average not greater than 1.

The average number of monovalent substituents, x, is preferably greater than 0, more preferably greater than 0.5, and even more preferably greater than 0.9 and preferably not greater than 3, more preferably not greater than 2, and even more preferably not greater than 1.5.

The substituted or unsubstituted aliphatic groups of $R^4$ have at least 4 carbon atoms, preferably at least 6 carbon atoms, more preferably at least 8 carbon atoms, and even more preferably at least 9 carbon atoms, and preferably not more than 20 carbon atoms, more preferably not more than 18 carbon atoms, and even more preferably not more than 16 carbon atoms and may be branched or unbranched and saturated or unsaturated. The degree of unsaturation is preferably monoene, diene, or triene, and more preferably monoene. When present, preferred substituents on the aliphatic group include oxyalkylenes, ethers, poly(ether)s, and esters. Examples of $R^4$ aliphatic groups include n-butyl, i-butyl, t-butyl, amyl, hexyl, heptyl, octyl, nonyl, dodecyl, dodecenyl, pentadecyl, and pentadecenyl.

The substituted or unsubstituted cycloaliphatic groups of $R^4$ have at least 5 carbon atoms, preferably at least 6 carbon atoms, and may be substituted with substituted or unsubstituted aliphatic, oxyalkylene, ether, poly(ether), and/or ester groups. Examples of preferred cycloaliphatic groups include cyclohexane and cyclohexane with one or more of the above-described aliphatic groups.

The poly(oxyalkylene) group of $R^4$ has an average number of carbon atoms per oxyalkylene unit of at least 3, preferably at least 4, and preferably up to 8, more preferably up to 6. The average number of oxyalkylene units per poly(oxyalkylene) group is preferably at least 2, more preferably at least 4, and even more preferably at least 6, and preferably up to 30, more preferably up to 20 and even more preferably up to 12. Examples of preferred poly(oxyalkylene) groups include poly(oxybutylene), poly(oxyisobutylene), and poly(tetrahydrofuran).

The aryl group of $R^4$ is an aromatic ring system which preferably comprises at least one six-membered aromatic ring, such as a phenyl ring or a naphthyl ring. The aryl group has one or more substituents independently selected from aliphatic groups, cycloaliphatic groups, and poly(oxyalkylene) groups as described above, including the aforementioned preferences.

The substituent(s) of $R^4$ may be selected from a wide range including, but not limited to, C1-3 alkyl groups, C1-3 alkoxy groups, halogen atoms, and functional groups. The functional groups preferably do not include amino groups and/or oxirane groups. Preferred functional groups, when present, include one or more —OH groups, particularly one or more alcoholic —OH groups. In a preferred embodiment, $R^4$ does not have any functional groups.

The molar ratio of $R^4$—$X^1$ substituents to epoxy substituents in the oligomer molecule having multiple units according to Formula (I) is preferably not greater than 1:1, more preferably not greater than 0.8:1, and even more preferably not greater than 0.6:1 and preferably at least 0.1:1 and more preferably at least 0.2:1.

Each $R^1$, $R^2$, and $R^3$ independently preferably represents —H.

The divalent hydrocarbylene group having from 1 to 6 carbon atoms of divalent group X is preferably a substituted or unsubstituted methylene group or a straight or branched alkylene group having from 2 to 6 carbon atoms. The substituents on the substituted methylene group are preferably methyl groups.

The ether group having 2 to 6 carbon atoms of divalent group X is preferably a dimethylene ether group, diethylene ether, dipropylene ether, or di-isopropylene ether group.

Each unit of Formulae (I) is preferably bonded to a ring carbon atom of a phenyl ring of another unit of Formula (I) via a divalent X group. In a more preferred embodiment, the oligomer is comprised solely of units according to Formula (I).

In a preferred embodiment, the oligomer comprising multiple units of Formula (I) per molecule comprises at least one unit of Formula (III) per molecule:

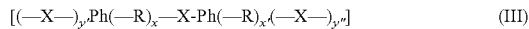
(III)

In Formula (III), each Ph, X and R independently has the same meaning as in Formula (I); each x and x' independently represents an average number greater than 0, preferably at least 1, and preferably up to 3, and more preferably up to 2; each y' independently represents a number in the range from 0 to 3, preferably 0 or 1, and even more preferably 0; and y'' independently represents a number in the range from 0 to 3, preferably 0 or 1, and even more preferably 1.

Each $R^4$ and $X^1$ of substituent R independently has the same meaning as in Formula (I). In a preferred embodiment, each $X^1$ independently represents a covalent bond, oxy, thio, carbonyloxy, or —$X^2C(R^2)_2C(R^1)(OH)C(R^2)_2O$—, wherein $X^2$ represents a covalent bond, oxy or thio, and each $R^1$ and $R^2$, independently, has the same meaning as previously defined above in Formula (I).

The average number of units of Formula (III) in the oligomer is at least 1. In one embodiment, the oligomer comprises at least one unit of Formula (III) and at least one unit, preferably at least two units, of Formula (I) other than a unit of Formula (I) comprised in a unit of Formula (III).

In a particularly preferred embodiment, the oligomer may be represented by Formula (IV):

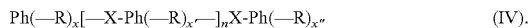
(IV).

In Formula (IV), each Ph, X and R group has the same meaning as in Formulae (I), including the above-described preferences, each x, x', and x'' independently represents an integer from 1 to the maximum number of positions available on the respective Ph aromatic ring, preferably 1, 2, or 3, and even more preferably 1 or 2; and n represents an integer in the range from 1 to 5, preferably 1 or 2, and even more preferably 1. The total number of R groups in the oligomer of Formula (IV) is preferably at least 3, more preferably at least 4, and preferably up to 8, more preferably up to 6. At least two, preferably at least three, R groups of the oligomer of Formula (IV) are represented by the formula

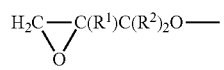

and at least one R group is $R^4X^1$—. Each $X^1$, $R^1$, $R^2$, and $R^4$ independently has the same meaning as in Formula (I), including the above-described preferences. In a preferred embodiment, each $X^1$ independently represents a covalent bond, oxy, thio, carbonyloxy, or —$X^2C(R^2)_2C(R^1)(OH)C(R^2)_2O$—, wherein $X^2$ represents a covalent bond, oxy or thio, and each $R^1$ and $R^2$, independently, has the same meaning as previously defined above in Formula (I).

The polyepoxide composition may comprise a mixture of two or more of the above-described oligomers. The mixture preferably comprises (1) one or more, preferably at least two, oligomers having an average of at least 2.5, preferably at least 3 and preferably not greater than 8, and more preferably not greater than 5, units of Formula (I) per oligomer molecule, (2) one or more, preferably at least two, oligomers having at least 1 unit, and preferably up to 2 units, of Formula (III) per molecule and/or (3) one or more oligomers, preferably at least two oligomers, according to Formula (IV). The mixture preferably has an average epoxy functionality of at least 2.2, preferably at least 2.5, and yet more preferably at least 2.8, and preferably up to 5, more preferably up to 4.

The polyepoxide composition preferably contains at least 5, more preferably at least 10, and even more preferably up to 15, and preferably up to 80, more preferably up to 50, weight-percent oligomer having at least one an $R^4X^1$— aromatic ring substituent in which $R^4$ and $X^1$ has the same meaning as in Formula (I) (1) comprising multiple units represented by the above-described Formula (I), (2) comprising at least one unit of the above-described Formula (III) and/or (3) represented by above-described Formula (IV). The remainder of the polyepoxide composition preferably comprises oligomer (1) comprising multiple units represented by the above-described Formula (I), (2) comprising at least one unit of the above-described Formula (III) and/or (3) represented by above-described Formula (IV) and more preferably comprises one or more polyepoxide precursors of the polyepoxide oligomer(s) present in the mixture having at least one of the specified $R^4X^1$— aromatic ring substituents.

In a particularly preferred embodiment, the polyepoxide composition comprises at least one of the above-described oligomers in which the $R^4X^1$— aromatic ring substituents is present in the oligomer molecule and one or more polyepoxide precursors thereof. According to this embodiment, preferably at least 20, more preferably at least 50, and even more preferably at least 80, weight-percent of the oligomers present in the polyepoxide composition having one or more of the $R^4$ groups is derived from one or more of the same polyepoxide precursors as are present in the remainder of the polyepoxide composition. The polyepoxide precursors preferably comprise multiple units of Formula (IB), at least one unit of Formula (IIIB) and optionally at least one unit of Formula (IB), and/or is represented by Formula (WB).

Another aspect of the present invention is a process for making polyepoxide compositions suitable for use in the kit according to the present invention comprising reacting, optionally in the presence of one or more catalysts, such as quaternary phosphonium salts and/or quaternary ammonium salts:

(a) at least one aromatic polyepoxide reactant having an average of at least 2.5 epoxy groups with (b) 0.05 to less than 0.5 equivalent per epoxy equivalent of the aromatic polyepoxide reactant (a) of at least one epoxy-reactive compound having at least one $R^4X^1$ substituent, wherein $R^4$ and $X^1$ are defined as in Formula (I), and one functional group capable of reacting with an epoxy group to form at least one covalent bond between the polyepoxide compound (a) and the epoxy-reactive compound (b).

The aromatic polyepoxide reactant (a) preferably has units of Formula (IA):

 (IA)

in which each $R^A$ represents

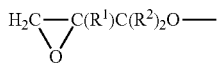

and each Ph, X, $R^1$, $R^2$, x, and y independently has the same meaning as in the above polyepoxide units of Formula (I).

In a preferred embodiment, the aromatic polyepoxide (a) comprising multiple units according to Formula (IA) comprises at least one unit of Formula (IIIA):

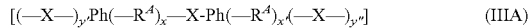 (IIIA)

wherein each $R^A$ independently has the same meaning as in Formula (IA) and each Ph, X, x, x', z, and z', independently, has the same meaning as in the above polyepoxide units of Formula (III). In a preferred embodiment, the aromatic polyepoxide (a) comprises one unit of Formula (IIIA) and at least one, preferably 2, units of Formula (IA).

In a particularly preferred embodiment, the aromatic polyepoxide (a) may be represented by Formula (IVA):

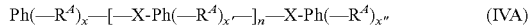 (IVA)

wherein each $R^A$ independently has the same meaning as in Formula (IA) and each Ph, X, $R^1$, $R^2$, x, x', x'', and n, independently, has the same meaning as in the above polyepoxide units of Formula (IV).

The aromatic polyepoxide reactant comprising multiple units of Formula (IA) and/or at least one unit of Formula (IIIA), and/or represented by Formula (IVA), preferably comprises an average of at least 2.5 units of Formula (IA), preferably less than 1, more preferably less than 0.5, and even more preferably zero, $R^4X^1$ substituent per molecule, and/or an average epoxy functionality per molecule greater than 1.5, preferably greater than 2, and even more preferably greater than 2.5 and preferably up to 8, more preferably up to 5. The aromatic polyepoxide reactant is preferably a novolac-based poly-epoxide, such as D.E.N. 431 and D.E.N. 438 epoxy novolacs available from The Dow Chemical Company.

The epoxy-reactive compound has a functional group capable of reacting with epoxy groups to form a covalent bond. Examples of functional groups include thiol, hydroxyl, carboxy, and carboxylic ester. The corresponding epoxy-reactive groups include $R^4SQ$, $R^4C(O)OQ$, and $R^4OQ$, in which $R^4$ has the same meaning as in Formula (I), including the preferred meanings, and Q refers to a hydrogen atom or a cation. The cation Q is preferably selected from ammonium, phosphonium, and/or metal cations, preferably alkali metal cations such as $Na^+$, $Li^+$ and $K^+$. Examples of epoxy-reactive compounds and processes for reacting epoxy-reactive compounds with aromatic polyepoxides are provided in EP 1 620 484, and U.S. Pat. No. 4,722,990, the relevant portions of which are hereby incorporated by reference.

The amount of epoxy-reactive compounds (b) reacted with the polyepoxide oligomer (a) is at least 0.05, preferably at least 0.1, and more preferably 0.2, equivalent up to 0.5, preferably up to 0.4, and more preferably up to 0.3, equivalent per epoxy equivalent.

Oligomers:

Another aspect of the present invention is an oligomer suitable for use in the kit according to the present invention having an average epoxy functionality of at least 2 and comprising multiple units per oligomer molecule represented by the above Formula (I), preferably comprising at least one unit of Formula (III) alone or, preferably, combined with at least one unit, preferably no more than two units, of Formula (I), wherein:

(1) (a) at least one unit of Formula (I) within an oligomer molecule has at least one —$C(R^2)_2$— and/or —$C(R^2)_2OC(R^2)_2$— as divalent group "X" as described above and at least one $R^4X^1$— substituent as described above and (b) at least one unit of Formula (I) within the same oligomer molecule does not have at least one $R^4X^1$— substituent and/or (2) at least one unit of Formula (I), preferably at least one unit of Formula (III), within an oligomer molecule has at least one $R^4X^1$— substituent wherein $R^4X^1$— represents $R^4X^2C(R^2)_2C(R^1)(OR^3)C(R^2)_2O$— in which (a) $R^1$, $R^2$, $R^3$ and $R^4$ have the same meaning as in Formula (I) and $X^2$ represents a covalent bond, oxy or thio and/or (b) $X^2$, $R^1$, $R^2$ and $R^3$ have the same meaning as in Formula (I) and $R^4$ represents the above-described substituted or unsubstituted aliphatic group having at least 4 carbon atoms, substituted or unsubstituted cycloaliphatic group having at least 5 carbon atoms, or poly(oxyalkylene) group wherein the average number of carbon atoms per oxyalkylene group is at least 3.

The oligomer preferably may be represented by the above-described Formula (IV) and each of the groups $R^1$, $R^2$, $R^3$, $R^4$, $X^1$, and $X^2$ independently include the preferred meanings set forth in the previous section to the extent that they are consistent with the above definition.

A further aspect of the present invention is a process suitable for making oligomers according to the present invention comprising epoxidizing at least one phenolic precursor according to the present invention optionally in the presence of one or more catalysts, such as quaternary ammonium salts.

Phenolic precursors suitable for making oligomers according to the present invention include phenolic precursors according to the present invention comprising an average of at least 2.5, preferably at least 3, phenolic —OH substituents per phenolic precursor molecule and multiple units of Formula (IA):

 (IB)

within the phenolic precursor molecule, wherein each $R^B$ of Formula (IB) independently represents a monovalent group covalently bonded to the aromatic ring selected from $R^4X^1$— and —OH; each Ph, X, $X^1$, $R^4$, x and y of Formula (IB) independently has the same meaning as in the above polyepoxide units of Formula (I); the number of Ph groups per phenolic precursor molecule exceeds the number of X groups in the same phenolic precursor molecule by one Ph group; and the multiple units of Formula (IB) within the phenolic precursor comprise:

(1) (a) at least one unit of Formula (IB) within a phenolic precursor molecule has at least one —C($R^2$)$_2$— and/or —C($R^2$)$_2$OC($R^2$)$_2$— as divalent group "X" as described above and at least one $R^4X^1$— substituent as described above and (b) at least one unit of Formula (IB) within the same phenolic precursor molecule does not have at least one $R^4X^1$— substituent and/or (2) at least one unit of Formula (IB) within a phenolic precursor molecule has at least one $R^4X^1$— substituent wherein $R^4X^1$ represents $R^4X^2C(R^2)_2C(R^1)(OH)C(R^2)_2$O— in which $X^2$, $R^1$ and $R^2$ have the same meaning as in Formula (IA) and $R^4$ represents the above-described substituted or unsubstituted aliphatic group, substituted or unsubstituted cycloaliphatic group, or poly(oxyalkylene) group.

In a preferred embodiment, the phenolic precursor comprising multiple units according to Formula (IB) comprises at least one unit of Formula (IIIB):

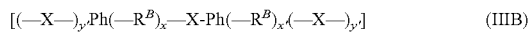   (IIIB)

wherein each $R^B$ independently has the same meaning as in Formula (IB) and each Ph, X, x, x', y', and y", independently has the same meaning as in Formula (III). In a preferred embodiment, the aromatic polyepoxide (a) comprises one unit of Formula (IIIB) and at least one, preferably 2, units of Formula (IB).

In a particularly preferred embodiment, the aromatic polyepoxide (a) may be represented by Formula (IVB):

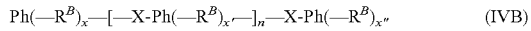   (IVB)

wherein each $R^B$ independently has the same meaning as in Formula (IB) and each Ph, X, $R^1$, $R^2$, x, x', x", and n, independently, has the same meaning as in Formula (IV).

Each of the groups $R^1$, $R^2$, $R^4$, $X^1$, and $X^2$ independently include the preferred meanings set forth in the previous section to the extent that they are consistent with the above definition.

The phenolic precursor comprising multiple units of Formula (IB) and/or at least one unit of Formula (IIIB), and/or the phenolic precursor of Formula (IVB), preferably comprises an average of at least 2.5 units of Formula (IB) and/or an average phenolic —OH functionality per molecule greater than 1.5, preferably greater than 2, and even more preferably greater than 2.5 and preferably up to 8, more preferably up to 5. The phenolic precursor is preferably a novolac, such as a phenol novolac or a cresol novolac.

Suitable phenolic precursors are also obtainable by condensing a mixture comprising at least one phenolic compound not having at least one $R^4X^1$— substituent and at least one phenolic compound at least one $R^4X^1$— substituent with at least one aldehyde and/or ketone, optionally in the presence of one or more acidic catalysts for the condensation reaction, wherein the $R^4X^1$— substituent is defined as in above Formulae (I) and (IB). The aldehyde is preferably formaldehyde and the ketone is preferably acetone. This process is described in more detail in U.S. Pat. No. 4,250,076, which is hereby incorporated herein for its relevant disclosure.

Phenolic precursors suitable for making oligomers according to the present invention are also obtainable by grafting one or more $R^4$ groups on one or more aromatic rings of one or more phenolic compounds having multiple units of Formula (IB) and preferably an average of less than 1, preferably less than 0.5, and even more preferably zero, $R^4X^1$ substituent per molecule at an average molar ratio of $R^4$ groups to Formula (IB) units in the range from at least 0.05, preferably at least 0.1, and even more preferably at least 0.2, up to 0.5, preferably up to 0.4, and more preferably up to 0.3. The one or more $R^4$ groups are grafted on one or more aromatic rings by reacting one or more compounds of the Formula $R^4H$ in which $R^4$ has at least one, preferably not more than one, unsaturated carbon-carbon bond. Preferably at least one, and preferably not more than one, unsaturated carbon-carbon bond of Formula $R^4H$ is a terminal unsaturated carbon-carbon bond. The unsaturated carbon-carbon bond is preferably not between ring members of an aromatic ring. Examples of suitable unsaturated compounds of Formula $R^4H$ include aliphatic groups having an unsaturated carbon-carbon bond such as hexenes, octenes, nonenes, decenes, ethyldecenes, pentyldecenes, especially aliphatic compounds having a terminal unsaturation such as an α-olefin (e.g., hex-1-ene, oct-1-ene, dec-1-ene, dodec-1-ene, and pentadec-1-ene); unsaturated cycloaliphatic compounds, preferably having from 6 to 10 carbon atoms, such as vinylcyclohexanes, cyclohexenes, dicyclopentadiene, pinenes, camphenes, and other terpenes; and vinyl benzenes, such as styrene, having one or more substituents, bonded directly to the aryl group via a covalent bond or bonded to the aryl group via an oxy, a thio, or a carbonyloxy divalent linking group, including one or more substituted or unsubstituted aliphatic groups having at least 4 carbon atoms, one or more substituted or unsubstituted cycloaliphatic groups having at least 5 carbon atoms, and/or one or more poly(oxyalkylene) groups wherein the average number of carbon atoms per oxyalkylene unit is at least 3. The grafting process is described in more detail in U.S. Pat. No. 4,250,076, which is hereby incorporated herein for its relevant disclosure.

Suitable phenolic precursors may also be made by reacting:

(a) at least one phenolic compound having an average of at least 2.5, preferably at least 3, phenolic —OH groups with (b) an average from 0.05 to less than 0.5 equivalent per phenolic hydroxy group equivalent of the phenolic compound (a) of at least one monofunctional compound comprising $R^4$ and a functional group capable of reacting with a phenolic hydroxy group of the phenolic compound (a) to form at least one covalent bond between the compound (b) and the phenolic compound (a), in which $R^4$ has the same meaning as described above, including the preferred meanings.

The phenolic compound (a) preferably has an average of less than 1, more preferably less than 0.5, and even more preferably zero, $R^4X^1$ substituent per molecule.

The phenolic compound (a) preferably comprises a reaction product of (1) aldehyde and/or ketone and (2) at least one phenolic compound having an average of at least 1, preferably at least 1.5, up to 3, preferably up to 2, phenolic —OH group(s) and preferably less than 0.75, more preferably less than 0.5, and more preferably zero, $R^4X^1$— substituent per molecule. The aldehyde is preferably formaldehyde and/or acetaldehyde and the ketone is preferably acetone.

The phenolic compound (a) preferably comprises novolac, most preferably phenol novolac or cresol novolac. Phenol novolacs are obtainable by the acid catalyzed condensation of phenols with an aldehyde. Cresol novolacs are obtained by acid catalyzed condensation of cresol with an aldehyde.

The monofunctional compounds comprise a $R^4$ group as defined in Formulae (I) and (IB) and one functional group capable of reacting with phenolic —OH groups of phenolic compound(s) (a) to form a covalent bond generally via the oxygen atom of the respective phenolic —OH group. Examples of suitable functional groups include groups having an oxirane ring, alcoholic —OH groups, cyclic alkylene carbonates, and electrophiles such as tosylates, bromides and iodides.

The monofunctional compound (b) preferably comprises at least one compound represented by the formula:

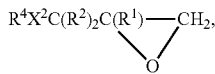

in which each $R^1$, $R^2$, $R^4$, and $X^2$ independently has the same meaning as in above Formulae (I) and (IA). Examples of monoepoxide compounds include nonyl glycidyl ether, decyl glycidyl ether, dodecyl glycidyl ether, tridecyl glycidyl ether, tetradecyl glycidyl ether, pentadecyl glycidyl ether, nonylphenol glycidyl ether, decylphenol glycidyl ether, etc. Examples of monoepoxide compounds derived from α-olefins include 1,2-epoxydecane; 1,2-epoxydodecane; 1,2-epoxytetradecane; 1,2-epoxyhexadecane; 1,2-epoxyoctadecane, etc.

The reaction of $R^4OH$ with phenolic —OH groups of phenolic compound(s) (a) is preferably carried out under suitable conditions, such as via Williamson ether synthesis. According to the Williamson ether synthesis method, the phenolic compound(s) is/are preferably reacted with an alkali metal, such as sodium or potassium, or an alkali metal salt such as sodium carbonate, to form an alkali metal phenolate intermediate. The alkali metal phenolate intermediate is preferably reacted with the $R^4$ group terminated with one of the above-described electrophiles to bond $R^4$ to the aromatic ring of the phenolate intermediate via X' in which X' represents oxy (—O—) derived from a former phenolic —OH group of the phenolic compound(s) (a). The electrophile-terminated $R^4$ group is preferably derived from $R^4OH$.

Monofunctional compounds comprising cyclic alkylene carbonates include 1,3-dioxolan-2-ones comprising at least one $R^4$ group. Such carbonates are obtainable by carbon dioxide insertion into an oxirane ring of an appropriate oxirane-ring-bearing compound in the presence of an appropriate catalyst, such as one or more alkylammonium halide catalysts. Processes for making suitable cyclic alkylene carbonates are described in U.S. Pat. No. 2,987,555, which is hereby incorporated herein by reference for its relevant disclosure.

The cyclic alkylene carbonates comprising $R^4$ may be reacted with one or more phenolic compounds (a) in the presence of one or more alkali catalysts to bond $R^4$ to the phenyl ring via an oxygen atom as $X^1$ and introduce a hydroxyl substituent on $R^4$. This reaction and suitable alkali catalysts are described in more detail in U.S. Pat. No. 5,679,871, which is hereby incorporated herein by reference for its relevant disclosure.

The amount of monofunctional compounds (b) reacted with the phenolic compound (a) is at least 0.05, preferably at least 0.1, and more preferably 0.2, up to 0.5, preferably up to 0.4, and more preferably up to 0.3, equivalent per phenolic hydroxy group equivalent of phenolic compound (a).

Another aspect of the present invention is a process for making phenolic precursors comprising reacting, optionally in the presence of one or more catalysts, (1)(a) at least one phenolic compound not having at least one $R^4X^1$— substituent and (b) at least one phenolic compound having at least one $R^4X^1$— substituent with (2) at least one epoxy compound having an average epoxy functionality of at least 2 per molecule, wherein the phenolic compounds have an average of at least 2, preferably at least 2.5, phenolic —OH groups per molecule and the $R^4X^1$— substituent is defined as in above Formulae (I) and (IA).

Another aspect of the present invention is a process for making phenolic precursors comprising reacting, optionally in the presence of one or more catalysts (e.g., quaternary phosphonium salts and/or quaternary ammonium salts) (1) at least one phenolic compound having an average of at least 2.5, more preferably at least 3, phenolic —OH substituents and preferably less than 1, preferably less than 0.5, and even more preferably zero, $R^4X^1$ substituent per phenolic compound molecule and (2) at least one epoxy compound having an average epoxy functionality less than 1.5, preferably 1, comprising at least one $R^4$ group, wherein each $R^4$ group is independently selected from a substituted or unsubstituted aliphatic group having at least 4 carbon atoms, a substituted or unsubstituted cycloaliphatic group having at least 5 carbon atoms, or a poly(oxyalkylene) group wherein the average number of carbon atoms per oxyalkylene unit is at least 3.

Oligomers having multiple units of Formula (I) may be made by epoxidizing the phenolic precursors obtainable according to any one of the above processes. In particular, the phenolic precursors may be epoxidized by reacting the phenolic precursors with excess epichlorohydrin followed by dehydrohalogenation, such as by contacting the reaction product with a strong base such as sodium hydroxide. This process may optionally be carried out in the presence of one or more catalysts, such as one or more quaternary ammonium catalysts.

In each chemical formula above referring to Ph and requiring the presence of at least one epoxy group, each Ph optionally has one or more monovalent aromatic ring substituents other than $R^4X^1$— and

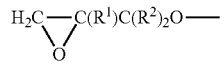

and each chemical formula above referring to Ph and requiring the presence of at least one phenolic hydroxy group, each Ph optionally has one or more monovalent aromatic ring substituents other than $R^4X^1$— and phenolic hydroxy. Such other monovalent aromatic ring substituents are preferably monovalent hydrocarbyl groups optionally having one or more hetero atoms. Examples of such other monovalent aromatic ring substituents include alkyl groups other than $R^4X^1$—, such as methyl, ethyl, propyl and/or isopropyl, and/or alkoxy groups other than $R^4X^1$—, such as methoxy, ethoxy, propoxy, and isopropoxy.

When $R^4$ of $R^4X^1$— has at least 6 carbon atoms or when $X^1$— is not a covalent bond, other preferred monovalent aromatic ring substituents include higher alkyl groups such as n-butyl, iso-butyl, t-butyl, and amyl.

When $R^4$ of $R^4X^1$— has at least 6 carbon atoms or when $X^1$— is not oxy, other preferred monovalent aromatic ring substituents include higher alkoxy groups such as n-butoxy, iso-butoxy, t-butoxy, and amyloxy.

Curing Agents:

The curing agents are selected from curing agent compounds of Formula (VI):

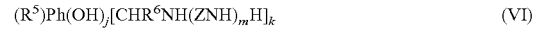

in which Z represents a divalent hydrocarbylene group; $R^5$ represents the $C_{8-20}$ saturated or unsaturated aliphatic ring substituent; each $R^6$ independently represents a hydrogen atom, a hydrocarbyl group having from 1 to 10 carbon atoms or a hetero atom, preferably a hydrogen atom; m is an integer in the range from 1 up to 5, preferably up to 3, and more preferably up to 1; k represents an integer in the range from 1 up to 3, preferably 1; and j represents 1 or 2 and/or one or more adducts of the one or more compounds of Formula (VI).

The divalent hydrocarbylene group Z may have from 1 up to 30, more preferably up to 20, even more preferably up to 10, carbon atoms and may be a divalent branched- or straight-chain, saturated or unsaturated, aliphatic group preferably having at least 1, more preferably at least 2, up to 20, more preferably up to 10, and even more preferably up to 4, carbon atoms; a substituted or unsubstituted, saturated or unsaturated, cycloaliphatic ring having from 5 to 7 carbon atoms; a substituted or unsubstituted aromatic ring preferably having 6 carbon atoms; or a combination of the foregoing.

In one preferred embodiment, Z represents ethylene, propylene, isopropylene, n-butylene, or i-butylene.

In another preferred embodiment, Z represents —C($R^7$)$_2$-A-C($R^7$)$_2$—, wherein each $R^7$ independently represents —H or a $C_{1-4}$ alkyl group and A represents a substituted or unsubstituted cyclohexylene or phenylene group.

The aliphatic substituent $R^5$ on the phenyl ring of the phenol preferably has at least 12 and preferably up to 18 carbon atoms and up to 3 carbon-carbon double bonds, and more preferably is a straight chain, unsubstituted aliphatic hydrocarbyl group having 15 carbon atoms and 0 to 3 carbon-carbon double bonds. The aliphatic group is preferably in the meta-position relative to the phenolic hydroxy group. In a preferred embodiment, the phenol having at least one $C_{8-20}$ aliphatic ring-substituent is cardanol. Cardanol is the main product obtained by thermal treatment of cashew nut shell liquid (CNSL). Polyamines reacted with cardanol are referred to as phenalkamines. Phenalkamines, such as Cardolite™ 540, 541, and 541LV phenalkamine hardeners (commercially available from Cardolite Corporation having offices in Newark, N.J., U.S.A.), are preferred.

In a more specific embodiment, the curing agent may be represented by the following Formula (VII):

$(R^5)Ph(OH)[CH_2NH(ZNH)_mH]_k$ (VII)

in which Z represents a divalent branched or straight $C_{2-8}$-alkylene group, which is preferably selected from ethylene, propylene, isopropylene, butylene and isobutylene, and even more preferably ethylene. $R^5$ represents the $C_{8-20}$ aliphatic ring substituent described above, m has the same meaning as in Formula (V) and k represents an average number of at least 1, preferably at least 1.5 up to 3, and preferably up to 2.5. The $R^5$ ring substituent is preferably in the meta-position relative to the phenolic —OH group.

The curing agents are preferably obtainable by reacting at least one phenol having at least one $R^5$ substituent, at least one polyamine and at least one aldehyde, simultaneously or in any order, and adducts of such compounds.

In a preferred embodiment, the polyamine has the Formula (VIII):

$H_2N(ZNH)_mH$ (VIII)

in which Z and m have the same meaning as in Formula (VI) respectively, more preferably Z and m have the same meaning as in Formula (VII) respectively.

In a more specific embodiment, polyamines suitable for making curing agents represented by Formula (VII) are preferably poly(alkylene amines) having at least 2 amine groups per molecule. The alkylene group(s) preferably has/have at least 1, more preferably at least 2, and preferably up to 6, more preferably up to 3, carbon atoms. A preferred alkylene group is an ethylene group. More preferably, the polyamine has the Formula (IX):

$H_2N(CH_2CH_2NH)_mH$ (IX)

in which m is an integer in the range from 1 to 5. The mole ratio of polyamine to the phenol having at least one $C_{8-20}$ aliphatic ring—substituent is preferably in the range from 1.5 to 3. The reaction product preferably contains an average of at least 1, more preferably at least 1.5, up to 3, more preferably up to 2.5, primary amine groups per molecule.

The mole ratio of aldehyde to phenol having at least one $R^5$ substituent is preferably in the range from 1.6 to 2.5. The mole ratio of aldehyde to polyamine is preferably in the range from 1.05 to 1.25. The aldehyde is preferably formaldehyde.

Further descriptions of suitable curing agents and how to make them is provided in GB 1529740 and EP 1 091 926, the relevant disclosures of which are incorporated herein by reference.

The curing agent may also be at least one adduct of the above-described curing agents. The adducts may be (meth)acrylates, poly(meth)acrylates, mono- and polyepoxides, free mono- and polyisocyanates, blocked polyisocyanates, and mixtures thereof. Preferred adducts include mono- and polyepoxides. Phenalkamine adducts, such as Aradur™ 3467 from Huntsman Chemicals, are preferred.

A description of how to carry out adduction of curing agents of Formula (VI) is provided in EP 684 268 A1, the relevant disclosure of which is incorporated herein by reference.

Tertiary amines may be used in the amine hardener component as Lewis base catalysts to accelerate the coreaction of secondary amines. Suitable tertiary amine compounds that can be included in the amine hardener component include substituted phenolic amines, such as 2,4,6-tris(dimethylaminomethyl)phenol and dimethylamino-methylphenol. The proportion of tertiary amine compound in the amine hardener component is typically no more than about 20 weight-percent, based on the total weight of amines in the amine hardener component.

Formulations:

The polyepoxide compositions and curing agents may be formulated as epoxy base and hardener compositions for use in applications that require a curable two-component epoxy resin composition, such as coatings and sealants. Such formulations may contain auxiliary components in functional categories such as catalysts, thixotropes, solvents, fillers, air release additives, pigments, wetting additives, tackifiers, plasticizers, surfactants, dispersing agents, de-foaming agents, stabilizers, epoxy accelerators, corrosion inhibitors, coalescing agents, anti-settling agents, and/or dyes. The epoxy base and/or hardener compositions preferably contain auxiliary components in at least one, more preferably at least two, and even more preferably at least three, of the aforementioned auxiliary component functional categories.

Thixotropes may be included in the coating system. Suitable thixotropes include those suitable for epoxy coating systems in general, such as fibrous minerals (e.g., wollastonite), aramid fibers, particles or chips (such as KEVLAR), clays (such as bentonite, hectorite, smectite, attapulgite), amorphous fumed silicas (both untreated and surface treated), and waxes (such as polyamide waxes, hydrogenated castor oil).

Solvents can be included in amounts up to about 40 wt % based on the total weight of the coating system, and are typically selected from among those generally considered suitable for epoxy coating systems. Examples of solvents are alcohols, such as propanol, isopropanol, n-butanol, isobutanol, furfuryl alcohol, and benzyl alcohol; aromatic hydrocarbons, such as toluene, xylene, naphtha solvent, and AROMATIC 100 (petroleum hydrocarbon); ketones, such as methyl ethyl ketone, methyl isobutyl ketone, methyl-n-amyl ketone, methyl isoamyl ketone, diacetone alcohol and cyclohexanone; ether alcohols, such as 2-butoxyethanol, propylene glycol monoethyl ether, propylene glycol monomethyl ether and butyl diglycol; esters, such as methoxypropyl acetate, n-butyl acetate and 2-ethoxyethyl acetate; and mixtures thereof.

Fillers can be included in amounts ranging from about 25 wt % to about 40 wt %, based on the total weight of the coating system. They function to extend the coating, thereby decreasing its cost of application. Suitable fillers include barium sulfate, silica, calcium carbonate, aluminum oxide, talc, etc.

Certain pigments and fillers have a beneficial effect on the anticorrosive properties. Examples are aluminium pigments, zinc phosphate and mica. In the paint composition, the total amount of pigments and fillers may be in the range of 0-50%, such as 5-50% by solids volume of the paint, preferably 10-45%, such as 10-40% by solids volume of the paint.

Examples of plasticizers are hydrocarbon resins, phthalates and benzyl alcohol. In one preferred embodiment, the paint composition comprises a hydrocarbon resin as plasticizer.

The formulation may comprise epoxy accelerators. Examples are substituted phenols, such as p-tert-butylphenol, nonylphenol, etc.

The above-described polyepoxide composition is preferably present in the epoxy base in an amount of at least 1 wt %, more preferably at least 5 wt % and even more preferably at least 10 wt %, and preferably up to 100 wt %, more preferably up to 60 wt % and even more preferably up to 30 wt %, based on the total weight of the epoxy base.

Curing the Formulations:

The above-described polyepoxide compositions, optionally formulated as epoxy base as described above, and the above-described curing agents, optionally formulated as hardener compositions, may be provided to the end-user as a kit for use in applications that require a curable epoxy resin composition, such as paints and sealants. The curing agent component/hardener composition is admixed with the epoxy base to form a compositions comprising at least one curing agent (B)/hardener composition admixed with the oligomer (A)/epoxy base just prior to use as a coating or sealant. The composition is capable of curing at low ambient temperatures such as 15° C., 10° C., 5° C. and even 0° C. to form a dry-to-touch coating or seal in less than 10 hours, and preferably in less than 8 hours. In one embodiment, a coating process is conducted at an ambient temperature of 10° C. or less; and in another embodiment at an ambient temperature of 0° C. or less. In another embodiment, the coating process is conducted at an ambient temperature of from about 0° C. to about 10° C.

The epoxy base kit component is kept separate from the amine hardener kit component until the coating system is to be applied. At that point, the amine hardener component is mixed with the epoxy component. The resulting mixture is applied to the surface to be coated within a time period of about 10 minutes to about 60 minutes from the time of mixing. The mixture may be rolled, brushed, or sprayed onto the surface to be coated, and allowed a sufficient time to cure.

The selection of the ratio between the active hydrogen equivalents of the one or more curing agents and the epoxy equivalents of the one or more epoxy resins plays a certain role for the performance of the coating composition. Preferably, the ratio between the active hydrogen equivalents of the one or more curing agents and the epoxy equivalents of the one or more epoxy resins is in the range of 20:100 to 120:100. Especially preferred epoxy-based binder systems have a ratio between the active hydrogen equivalents of the one or more curing agents and the epoxy equivalents of the one or more epoxy resins in the range of 60:100 to 120:100, such as 70:100 to 110:100.

The reaction between the curing agent and the polyepoxide oligomer(s) of the epoxy base forms a three-dimensional covalently-crosslinked polymeric network. The three-dimensional covalently-crosslinked polymeric network preferably comprises at least one unit, and preferably multiple units, of Formula (II):

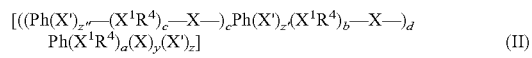

wherein each X' independently represents a polyvalent group of the chemical formula:

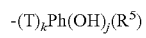

wherein T represents

T is covalently bonded to the phenyl ring of Formula (II); each Ph, X, X1, $R^1$, $R^2$, $R^3$ and $R^4$ independently has the same meaning as in Formula (I), including the above-described preferences; each $R^5$, $R^6$, Z, m, k and j independently has the same meaning as in Formula (VI), including the above-described preferences; each a, b, c, e, y, z, z', and z" independently, is equal to 0, 1 or 2; d is equal to 1 or 2; a+b+c≥1, preferably 1; and z+z'+z"≥1.

In Formula (II), each a, b, c, and y, independently, is preferably 0 or 1; d is preferably 1; and/or e is preferably 1. In one embodiment, a is preferably 1; the sum of z'+z" is preferably equal to a number greater than or equal to 1, more preferably at least 2; and/or each b and c independently, more preferably both b and c, is preferably equal to zero. In another embodiment, b is preferably 1; the sum of z and z" is preferably equal to a number greater than or equal to 1, more preferably at least 2; and/or each a and c independently, more preferably both a and c, is preferably equal to zero.

The present invention is further illustrated by the following examples.

EXAMPLES

Modified epoxy resins according to the invention and compositions containing unmodified epoxy resin and an alkylphenol provided as comparative examples are prepared by applying the following general procedures to the starting materials specified below in Table 1.

Examples 1 to 3

D.E.N. 438 (an epoxy novolac resin commercially available from The Dow Chemical Company having an EEW of about 180 and an average of about 3.6 epoxy groups per molecule) and 4-dodecylphenol are charged into a chemical reactor equipped with a condenser. The reactor contents are heated to 90° C. under nitrogen purge. At this temperature, 580 ppm of a 70 weight-percent solution of ethyltriphenylphosphonium acetate in methanol, based on the total weight of the reaction mixture, is added as a catalyst and the temperature of the reactor contents is increased to 190° C. and maintained at that temperature for about 30 minutes.

The reactor contents are then cooled to about 100° C. and diluted with sufficient xylene to reduce the nonvolatile content of the reactor contents to 80 weight-percent. The EEW and weight-percent dodecyl chain content of the reaction product is presented below in Table 1.

Example 4

Similar to example 1, except 0.095 mole of 3-pentadecenylphenol (Cardanol) was used per equivalent epoxy resin. After completion of the reaction, the resin was diluted with xylene to 80% nonvolatiles content.

The resultant product has an EEW=231.5 and 9.4% by weight of $C_{15}$ alkyl chain (on solids basis)

Example 5

89.1 parts by weight of D.E.N. 438 epoxy novolac resin were charged into a reactor equipped with a condenser followed by the addition of 10.9 parts of distilled linseed acid having an acid number of 201 mg KOH/g. (0.08 mole acid per equivalent epoxy resin). The contents are heated up to 90° C. under nitrogen purge, whereupon 500 ppm ethyl triphenyl phosphonium acetate catalyst were added. The temperature is then increased to ca. 140° C. and maintained at 140° C. under nitrogen purge for about 1 hour until the level of unreacted linseed acid below 0.1% is reached. Then the reaction product was cooled down to ca. 100° C. and diluted with xylene to 80% non volatiles content. The resultant product has an EEW=222 and 10.9% by weight of carboxylic alkyl chains (on a solids basis).

Example 6

180 parts by weight of D.E.N. 438 epoxy novolac resin were charged into a reactor equipped with a condenser followed by the addition of 45 parts of xylene. The contents are heated up to 50° C. under nitrogen purge and stirring, whereupon 1000 ppm ethyl triphenyl phosphonium acetate catalyst was added. Within 1 hour, 16.2 grams of dodecylmercaptan (0.08 mole per equivalent epoxy resin) are added. After the start of the exothermic reaction, cooling is applied to maintain the temperature between 50 and 60° C. The temperature is then maintained at that level for 3-4 hours until the level of free SH has dropped below detection levels. Then the reaction product was cooled down to ca. 25° C. and further diluted with xylene to 80% non volatiles content.

The resultant product has an EEW=215 and 6.9% by weight of $C_{12}$ alkyl chain (on a solids basis).

Example 7

77.4 parts by weight of a phenol formaldehyde novolac resin having on average 3.4 benzene rings per molecule is charged into a reactor equipped with a condenser and mixed with 22.6 parts of C12-C14 alkyl glycidyl ether having an EEW of 299. (0.1 mole epoxy per equivalent phenolic OH). The contents are heated up to 100° C. under nitrogen purge, whereupon 1000 ppm ethyl triphenyl phosphonium acetate catalyst was added. The temperature is then increased to ca. 190° C. and maintained at 190° C. for about 60 min, whereupon a sample is titrated to confirm that all oxirane groups are reacted away. Then the reaction product is cooled down.

The resultant modified phenol novolac resin is subsequently reacted with epichlorohydrin with a conventional process as described in the Houben-Weyl handbook (1987), Vol. E 20, pages 1916-1917. This reaction yields the corresponding polyfunctional glycidyl ether. This epoxy resin is diluted with xylene to 80% non volatiles content.

The resultant product has an EEW=233 (on solids basis) and contains ca 16% by weight of aliphatic side chain from the C12-C14 alkyl glycidyl ether.

Example 8

78.1 parts by weight of phenolic formaldehyde novolac resin, having on average 3.4 benzene rings per molecule are charged into a reactor equipped with a condenser and mixed with 21.9 parts of C16 alpha-olefin epoxide having an EEW of 240. (0.12 mole epoxide per equivalent phenolic OH). The contents are heated up to 100° C. under nitrogen purge, whereupon 1500 ppm ethyl triphenyl phosphonium acetate catalyst was added. The temperature is progressively increased to 180° C. and then maintained constant at for about 90 min, whereupon a sample is titrated to confirm that all oxirane groups are reacted away.

The resultant modified phenol novolac is subsequently converted into a polyfunctional glycidyl ether in a similar manner than in example 7. The epoxy resin is finally diluted with xylene to 80% non volatiles content.

The resultant product has an EEW=235 (on solids basis) and contains ca 16% by weight of aliphatic side chain from the $C_{16}$ α-olefin epoxide.

Example 9

75.2 g of phenol (0.8 mole), 52.5 g of 4-dodecylphenol (0.2 mole) and 1 g of oxalic acid are charged into a suitable reactor equipped with a condenser.

This mixture is condensed with 47.1 g of 45% formaldehyde solution (0.7 mole) with a conventional process as described in the Houben-Weyl handbook (1987), Vol. E 20, pages 1800-1802.

Residual monomers were removed with a stripping at 165° C. under vacuum.

The resultant novolac copolymer resin is subsequently reacted with epichlorohydrin with a conventional process as in the previous examples. The formed novolac glycidyl ether is diluted with xylene to 80% nonvolatiles content.

The resultant product has an EEW=226 (on solids basis) and contains ca. 17.6% by weight of $C_{12}$ aliphatic side chain from the 4-dodecylphenol monomer.

Comparative Examples 1 to 3

Comparative Examples 1 to 3 were prepared in the same way as Examples 1 to 3 of the invention, except that the ethyltriphenylphosphonium acid acetate catalyst was not added to the reactor contents and the components are mixed at a temperature of 80° C. In the absence of catalyst, there is no appreciable reaction between D.E.N. 438 and 4-dodecylphenol under those conditions.

Comparative Examples 1 to 3 therefore represent compositions containing a mixture of 4-dodecylphenol and unmodified epoxy resin in the proportions specified in Table 1 diluted with xylene to 80 weight-percent solids for comparison with Examples 1 to 3, respectively.

TABLE 1

Epoxy Resin Composition Starting Materials and Reaction Product Characteristics

| | Material | | | Reaction Product | |
|---|---|---|---|---|---|
| | D.E.N. 438 | 4-dodecylphenol or 3-pentadecenylphenol Units | | | |
| | wt. % | wt. % | moles/epoxy | EEW | wt. % $C_{12}$ alkyl or $C_{15}$ alkenyl |
| Example 1 | 87.2 | 12.8 | 0.10 | 229.6 | 8.3 |
| Example 2 | 81.9 | 18.1 | 0.15 | 255.2 | 11.7 |
| Example 3 | 77.2 | 22.8 | 0.20 | 294.5 | 14.7 |
| Example 4 | 86.3 | 13.7 | 0.095 | 231.5 | 9.4 |
| Comparative Example 1 | 87.2 | 12.8 | 0.10 | NR* | NR* |
| Comparative Example 2 | 81.9 | 18.1 | 0.15 | NR* | NR* |
| Comparative Example 3 | 77.2 | 22.8 | 0.20 | NR* | NR* |

*"NR" means "not reacted".
D.E.N. 438 × 80 (80 wt % D.E.N. 438 in xylene commercially available from The Dow Chemical Company having an average EEW of 225) and D.E.R. 337 × 80 (80 wt % D.E.R. 337, a Bisphenol A epoxy resin, in xylene commercially available from The Dow Chemical Company having an EEW of 300) are employed as reference products.

Evaluation of Formulations Made with Epoxy Resin Compositions and Hardener

Each of Examples 1 to 4 and Comparative Examples 1 to 3 is formulated to make a curable coating composition by admixing 1 weight-percent, on an epoxy resin basis, Ancamine K54 catalyst (commercially available from Air Products) and curing the resulting composition by admixing Cardolite™ 541V phenalkamine hardener (commercially available from Cardolite Corporation having offices in Newark, N.J., U.S.A.) at a final NH:epoxy equivalent ratio of 0.85:1.

After dispersing the curing agent in each coating formulation, each coating formulation is immediately applied to metal panels and glass strips at a wet film thickness of about 400 microns. Drying times are determined at ambient temperature and at 0° C. using a BK drying time recorder (SN 9.51/Model BK3, Drying Time Recorder available from Mickle Laboratories).

The above data shows that coating formulations made with the epoxy novolac resin D.E.N. 438×80 have a grainy appearance when cured using a phenalkamine hardener at room temperature or at 0° C. and the cured films remained sticky after 10 days aging.

Coating formulations of Comparative Examples 1 to 3 made with a mixture of D.E.N. 438×80 and 4-dodecylphenol had a similar undesirable feel and appearance after 10 days aging.

Coating formulations of Examples 1 to 3 made with a reaction product of the epoxy novolac resin with 4-dodecylphenol cured using a phenalkamine hardener achieved faster drying times at room temperature and 0° C. than either D.E.N 438×80 or D.E.R. 337×80 at the corresponding curing temperatures and produced a clear, nonsticky coating. Examples 1 to 3 also show that by increasing the mole-

TABLE 2

Coating Formulation Properties

| Property | D.E.N. 438 × 80 | D.E.R. 337 × 80 | Example 1 | Example 2 | Example 3 | Example 4 | Comparative Example 1 | Comparative Example 2 | Comparative Example 3 |
|---|---|---|---|---|---|---|---|---|---|
| Mole % dodecylphenol per epoxy equivalent | 0% | 0% | 10% | 15% | 20% | | 10% | 15% | 20% |
| Mole % 3-pentadecenylphenol per epoxy equivalent | | | | | | 9.5% | | | |
| Alkylphenol | | | Reacted | Reacted | Reacted | Reacted | Not reacted | Not reacted | Not reacted |
| Drying Time @ 23° C.* | 4.1 | 5.3 | 3.4 | 3.4 | 3.4 | 3.4 | — | — | — |
| Drying Time @ 0° C.* | 8.7 | 11.8 | 6.2 | 7 | 6.5 | 6.3 | — | — | — |
| Appearance of panels cured @ 23° C.** | Grainy, sticky after 10 days | Clear | Clear | Clear | Clear | Clear | Grainy, sticky after 10 days | Grainy, sticky after 10 days | Grainy, sticky after 10 days |
| Appearance of panels cured @ 0° C.** | Grainy, sticky after 10 days | slightly hazy | very slightly hazy | Clear | Clear | Clear | Grainy, sticky after 10 days | Grainy, sticky after 10 days | Grainy, sticky after 10 days |
| Gloss of panels cured @ 23° C.** | 35% | 90% | 56% | 79% | 69% | 54% | 37% | 66% | 66% |
| Gloss of panels cured @ 0° C.** | 22% | 70% | 50% | 79% | 95% | 50% | 33% | 50% | 44% |

Note
*End of gel tear was determined

Note
**Gloss and coating appearance are rated visually based on metal panels and glass strips, respectively, after curing and aging the respective compositions for ten days from the date on which the hardener is added. Gloss is determined using a Dr. Lange Model LMG 074 reflectometer (310369) at a 60° light beam incidence angle.

percent 4-dodecylphenol reacted with the epoxy resin, gloss can also be improved, particularly at low cure temperatures.

Example 4 made with the reaction product of the epoxy novolac resin with 3-pentadecenylphenol (Cardanol) showed a similar performance as that obtained with Example 1 with an improvement in panel appearance cured at 0° C.

The modified epoxy resins according to this invention therefore simultaneously improve the cure rate and surface appearance of epoxy coatings, especially when applied in a low temperature environment.

Advantages of the present invention include:
1. Better compatibility of the epoxy component with phenalkamine hardeners when cured at temperatures below 10° C.;
2. Improved defect-free surface appearance when cured with a phenalkamine hardener;
3. Faster cure rate at temperatures below 20° C. and in particular at a temperature below 10° C.; and
4. Faster hardness development at temperatures below 20° C. and in particular at temperatures below 10° C.

What is claimed is:

1. A polyepoxide composition comprising a mixture of oligomers having multiple units of Formula (I) per molecule:

wherein Ph represents a phenyl ring; each X independently represents a divalent group covalently bonded to the phenyl ring selected from a divalent hydrocarbylene group having from 1 to 6 carbon atoms, an ether group having 2 to 6 carbon atoms, and $-OC(R^2)_2C(R^1)(OR^3)C(R^2)_2O-$; each R independently represents a monovalent group covalently bonded to the phenyl ring selected from $R^4X^1-$ and

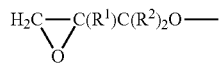

each $R^1$ independently represents —H or —$C_{1-14}$ alkyl; each $R^2$ independently represents —H or —$CH_3$; each $R^3$ independently represents —H or —$C(R^2)_2C(R^1)(OH)C(R^2)_2OPh(R)_x(-X-)_y$; each $R^4$ independently represents a substituted or unsubstituted aliphatic group having at least 4 carbon atoms, a substituted or unsubstituted cycloaliphatic group having at least 5 carbon atoms, a poly(oxyalkylene) group wherein an average number of carbon atoms per oxyalkylene unit is at least 3, or a substituted aryl group having one or more substituents, bonded directly to the aryl group via a covalent bond or bonded to the aryl group via an oxy, a thio, or a carbonyloxy divalent linking group, including one or more substituted or unsubstituted aliphatic groups having at least 4 carbon atoms, one or more substituted or unsubstituted cycloaliphatic groups having at least 5 carbon atoms, and/or one or more poly(oxyalkylene) groups wherein an average number of carbon atoms per oxyalkylene unit is at least 3, or a combination thereof; each $X^1$ independently represents a covalent bond or a divalent moiety selected from oxy, thio, carbonyloxy, and $-X^2C(R^2)_2C(R^1)(OH)C(R^2)_2O-$, wherein $X^2$ represents a covalent bond or a divalent moiety selected from oxy, thio, and carbonyloxy; x represents an integer in a range from 0 to 6 minus y; y represents an integer in a range from 0 to 3; x+y≥1; at least one oligomer of the mixture of oligomers has at least one divalent X group per molecule; Ph optionally has one or more monovalent aromatic ring substituents other than $R^4X^1-$ and

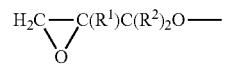

an average number of Ph groups per oligomer molecule in the mixture of oligomer molecules exceeds an average number of divalent X groups per oligomer molecule in the mixture of oligomer molecules; and the at least one oligomer comprises at least one unit of Formula (I) wherein at least one R substituent is $R^4X^1-$; the mixture of oligomers having an average of at least 2.5 units of Formula (I) per molecule and/or an average epoxy functionality of at least 2 per molecule; and a weight-ratio of oligomer molecules in the polyepoxide composition in which a $R^4X^1-$ substituent is not present in at least one unit of Formula (I) to oligomer molecules in the polyepoxide composition in which at least one unit of Formula (I) has at least one $R^4X^1-$ substituent is in a range from 5:95 to 80:20.

2. An epoxy base comprising a polyepoxide composition according to claim 1 and at least one auxiliary component selected from the group consisting of catalysts, thixotropes, fillers, air release additives, pigments, wetting additives, tackifiers, plasticizers, surfactants, dispersing agents, de-foaming agents, stabilizers, epoxy accelerators, corrosion inhibitors, coalescing agents, anti-settling agents, and/or dyes.

3. A composition comprising the epoxy base according to claim 2 and one or more curing agents selected from one or more compounds of Formula (VI):

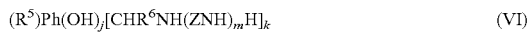

wherein each Z independently represents a divalent hydrocarbylene group having from 2 to 20 carbon atoms; $R^5$ represents a $C_{8-20}$ saturated or unsaturated aliphatic ring substituent; each $R^6$ independently represents a hydrogen atom or a hydrocarbyl group having from 1 to 10 carbon atoms and optionally at least one hetero atom; each m independently is an integer in the range from 1 to 4; k represents an integer in the range from 1 to 3; and j represents 1 or 2, and/or one or more adducts of one or more Formula (VI) compounds.

\* \* \* \* \*